Dec. 27, 1955  J. H. RAMSER  2,728,218

APPARATUS FOR MEASURING SOLIDS ENTRAINED IN GASES

Filed Feb. 11, 1952

ATTEST:

Clarence R. Patty, Jr.

INVENTOR.
JOHN H. RAMSER
BY Norbert E. Birch
ATTORNEY

United States Patent Office 2,728,218
Patented Dec. 27, 1955

2,728,218

APPARATUS FOR MEASURING SOLIDS ENTRAINED IN GASES

John H. Ramser, Chester, Pa., assignor to The Atlantic Refining Company, Philadelphia, Pa., a corporation of Pennsylvania Application February 11, 1952, Serial No. 271,017

7 Claims. (Cl. 73—28)

The present invention relates to improvements in apparatus adapted to determine and record the amount of entrained solid material in a fluid, and more particularly to determine and record the amount of catalyst fines present in the flue gas from a regenerator of a fluid catalytic cracking unit.

In the operation of a fluid catalytic cracking unit, finely divided catalyst particles are injected into the fluid charge stream and, suspended therein, are carried to the reactor where, after their activity has been spent, such particles are caused to settle out and to return to the regenerator. Hot air and steam blown through the regenerator remove coke or like matter deposited on the catalyst. As the hot air and steam are removed from the regenerator, such gases are passed through a cyclone separator and a precipitator to remove the catalyst particles remaining entrained therein. Although the greater part of the catalyst present in the gas is removed by such means there still remains a portion thereof suspended in said gas when it enters the flue leading from the precipitator. As the catalyst can be regenerated and used repeatedly, any loss thereof before it has become completely spent will increase the cost of the process being carried out. It is therefore of economic importance not only to observe and record the instantaneous amount of catalyst in the flue gases so that the concentration thereof may be kept at a minimum, but it is also important for a number of reasons to obtain and keep a record of the cumulative total of catalyst fines which have passed from the regenerator within a measured period of time.

In Patent No. 2,498,506, issued February 21, 1950, to John H. Ramser, and assigned to the assignor of the present application, there is disclosed an optical metering means by which the instantaneous concentration of catalyst fines contained in flue gas may be determined. It is an object of the present invention to provide apparatus capable of utilizing the intelligence furnished by a device of the nature disclosed in said patent, or a device of a similar nature, to furnish a record of the instantaneous and cumulative amounts of catalyst fines carried by flue gases.

It is a further object of this invention to provide apparatus for automatically combining a signal proportional to the instantaneous concentration of solid particles in a gas stream with a signal proportional to the instantaneous rate of flow of said gas, whereby to produce a third signal proportional to the instantaneous rate of flow of said particles.

It is a further object of this invention to provide apparatus for combining a signal proportional to the instantaneous concentration of solid particles in a gas stream with a signal proportional to the rate of volume flow of gas comprising said stream, to produce a third signal which is proportional to the instantaneous rate of flow of said solid particles and which is operative to control integrator means upon which is recorded the total amount of solid particles carried by said gas stream within a measured period of time.

Other objects and advantages of this invention will become apparent from the following description and drawings.

Briefly, this invention is concerned with apparatus which is adapted to provide a continuous record of the instantaneous amount of catalyst fines contained in flue gases from the regenerator of a fluid catalytic cracking unit, and also to provide a cumulative record of the total amount of such fines which have passed through the flue within a predetermined period of time. In its preferred form, the apparatus comprises one component which provides a signal proportional to the instantaneous concentration of catalyst fines in the flue gas, a second component which comprises means for producing a signal proportional to the instantaneous rate of flow of the flue gases, a third component which combines the signals from the first two components to produce a third signal proportional to the instantaneous rate of flow of the fines, and a fourth component which serves as integrator means to provide an indication of the total amount of catalyst fines which has flowed through the flue since the last setting of said integrator means.

Figure 1:
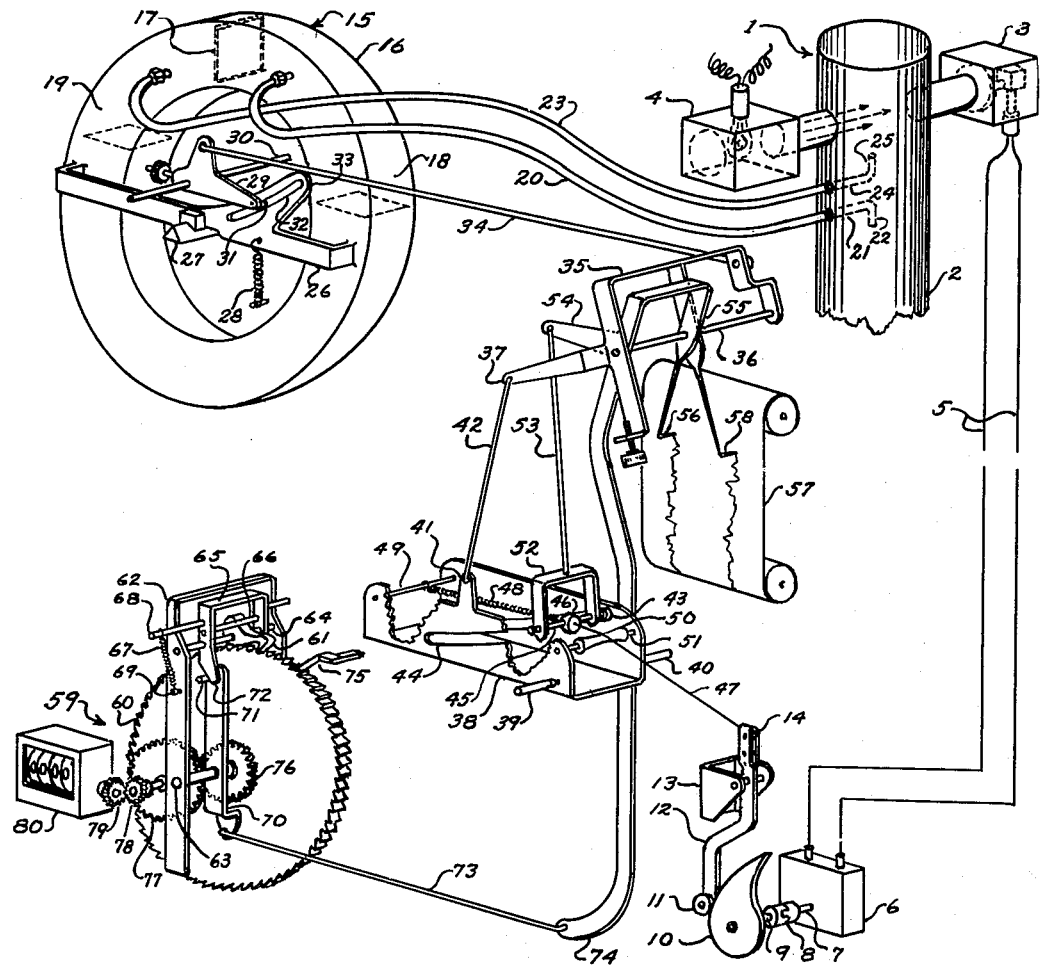
Figure 1 is a schematic diagram in which the various components of the apparatus contemplated by this invention are shown in their proper functional relationship with respect to each other.

In the drawings, the numeral 1 designates generally a device such as that disclosed in the above mentioned patent, No. 2,498,506, for determining the instantaneous concentration of catalyst fines in the flue gases passing through flue 2. As is explained in more detail in the above mentioned patent, the concentration of catalyst fines in flue gases passing through flue 2 influences the amount of light received by photocell 3 from light source 4, thus causing a variation in the voltage which is present across wires 5. Photocell 3 is preferably of the type which develops a voltage across wires 5 which is proportional to the intensity of light received from source 4. Wires 5 are connected to voltage measuring instrument 6, such as, for instance, a moving coil potentiometer, having a shaft 7, the rotational displacement of which is proportional to the voltage supplied thereto by wires 5. Shaft 7 is coupled, as for instance by coupling 8, to shaft 9 to which is secured logarithmically developed cam 10. In the particular embodiment shown in Figure 1, shaft 7, and consequently shaft 9 and cam 10, are adapted to be rotated clockwise upon an increase in concentration of solid particles in the gas passing between photocell 3 and source 4.

The periphery of cam 10 bears on cam roller 11, which is rotatably mounted on the lower end of lever 12 pivotally supported intermediate its ends by bracket 13. Thus the free, or upper, end 14 of lever 12 is movable about the pivot point of lever 12 in response to rotation of cam 10, which in turn is caused to rotate with shaft 9 in response to changes in concentration of catalyst fines in gases passing through flue 2, as set forth above.

The operation of so much of the device as is described above is as follows:

Light from source 4 will impinge upon photocell 3 with an intensity which varies inversely with the concentration of solid particles entrained in the flue gases which pass between the source and the photocell. It has been found experimentally that the relationship between concentration of solid particles and the intensity of light received by photocell 3 from a source of constant intensity 4 may be expressed approximately by the following equation:

$$C = k_1 \log \frac{I_0}{I} \quad (1)$$

where C is the concentration of solid particles in the flue gas (for instance, pounds of solid particles per cubic foot of flue gas), $I_0$ is the intensity of light reaching photocell 3 when the concentration C is zero, I is the instantaneous intensity of light reaching photocell 3, and $k_1$ is an experimental constant. Since the output voltage of photocell 3 is proportional to intensity of light reaching the photocell it will be seen that the concentration C is related to the output voltage of photocell 3 by the equation:

$$C = k_1 \log \frac{E_0}{E} \quad (2)$$

where $E_0$ is the output voltage of photocell 3 when the catalyst concentration is zero and E is the output voltage of photocell 3 at any instant.

As explained above, the output voltage from photocell 3 is supplied to moving coil potentiometer 6 which has a shaft 7, the rotational displacement of which is proportional to the voltage supplied by wires 5. Thus, it will be clear to one skilled in the art that shaft 7 will have an "at rest" position which it will assume whenever the voltage supplied to potentiometer 6 through wires 5 is $E_0$, the voltage generated by photocell 3 when the concentration C is zero; and that shaft 7 will rotate from its "at rest" position whenever the voltage supplied through wires 5 is some voltage E other than $E_0$, which will occur whenever the concentration C has some positive value. Since the angular position of shaft 7 varies directly with the voltage supplied through wires 5, it will be appreciated that the angular displacement of shaft 7, and likewise that of shaft 9 which is directly coupled to shaft 7, does not vary directly with changes in concentration C, but rather varies exponentially therewith as would be expected by an examination of Equation 2 above.

The mechanism comprising cam 10, cam roller 11, and lever 12 is provided for translating rotational displacement of shaft 9, which varies exponentially with concentration C, into a corresponding displacement of the free end 14 of lever 12, which will be directly proportional to changes in concentration C. To this end, the periphery of cam 10 is logarithmically developed. That is, the periphery of cam 10 is cut in such manner that the distance between its center of rotation and the point where the cam roller 11 bears upon its periphery is proportional to the logarithm of the angular displacement of shaft 9 upon which cam 10 is mounted. Thus, when shaft 9 is in its "at rest" position, cam roller 11 will bear upon the periphery of cam 10 at a predetermined point, whereby cam roller 11 will be maintained at a predetermined distance from the center of rotation of cam 10. Then, when shaft 9 is rotated, as will occur upon a change in concentration C, a different point on the periphery of cam 10 will be brought to bear upon cam roller 11, thus changing the distance between cam roller 11 and the center of rotation of cam 10.

Because of the fact that the periphery of cam 10 is logarithmically developed and the rotational displacement of shaft 9 varies exponentially with concentration, it will be appreciated by those skilled in the science of mathematics that the movement of cam roller 11 with respect to the center of rotation of cam 10, as cam 10 is rotated by shaft 9, will be proportional to concentration. Thus, it will be seen that the movement of free end 14 of lever 12, to the lower end of which cam roller 11 is secured, will be proportional to changes in concentration of solid particles entrained in the gases passing through flue 2.

It will be understood that free end 14 of lever 12 will have an "at rest" position which it will assume whenever the concentration of solid particles in the flue gas is zero, and that displacement from said "at rest" position will serve as an indication of the instantaneous value of said concentration of catalyst fines in the flue gases passing between light source 4 and photocell 3.

Numeral 15 designates generally a gauge for measuring the velocity of gases flowing through flue 2. In the specific embodiment shown, this instrument comprises a ring gauge 16, the lower portion of which is filled with a liquid, and the upper portion of which is divided by dam 17 into two gas compartments 18 and 19, respectively. Compartment 18 is connected by tube 20 to Pitot tube 21 which is inserted in flue 2 and oriented so that its right angle extension 22 points in a direction opposite to the flow of gas through the flue. Compartment 19 is connected by tube 23 to reversed Pitot tube 24, which is also inserted in flue 2 but with its right angle extension 25 pointing in the direction of flow gases. Ring gauge 16 has secured thereto, as by welding, a diametrically extending bridge member 26 by which ring 16 is supported for limited rotational motion on fulcrum 27. As will be appreciated by those skilled in the art the pressure in compartment 18 will, so long as gas is flowing upwardly in flue 2, be greater than the pressure in compartment 19 by an amount which is a function of the velocity of the gas flowing through flue 2. Upon an increase in the velocity of said gases, increased pressure in compartment 18 and decreased pressure in compartment 19 cause the gas in compartment 18 to exert a force on the surface of the liquid in contact with said compartment, tending to lower the level of said liquid, and consequently raise the level of liquid in contact with compartment 19. This inequality in the levels of the two ends of the liquid column causes ring gauge 16 to rotate about fulcrum 27 in a counterclockwise direction against the action of spring 28. It can be proved, as will be appreciated by those skilled in the science of physics, that the velocity of gas flowing through flue 2 is proportional to the square root of the pressure differential existing between compartment 18 and compartment 19. Also, it will be appreciated that the angular displacement of ring gauge 16 about fulcrum 27 is proportional to the same pressure differential. Therefore, it is seen that the instantaneous velocity of gas through flue 2 is proportional to the square root of the angular displacement of ring gauge 16 with respect to its position when no gas is flowing through flue 2. It will also be appreciated that, since the area of the flue at which Pitot tubes 21 and 24 are located is a constant, the angular displacement of ring gauge 16 serves as a measure of the volume rate of flow as well as the linear rate of flow of gas past said location.

Since, according to this invention, it is desired to obtain a signal which is directly proportional to the instantaneous rate of volume flow of gases through flue 2, apparatus is provided for translating the rotational motion of ring gauge 16, which, as pointed out above, is proportional to the square of the velocity to a complementary motion which is directly proportional to said velocity. In the embodiment shown, this is accomplished by means of bell crank lever 29 which is supported at pivot 30, and has fixed to one leg thereof a cam roller 31 which is adapted to cooperate with cam slot 32 provided in an upstanding portion 33 of bridge member 26. The other leg of bell crank lever 29 is attached to rod 34 which is in turn pivotally secured to bracket 35 which is adapted to freely pivot about rod 36. The components described above are so designed and so located with respect to each other that the angular displacement of bracket 35 about rod 36 is proportional to the square root of the angular displacement of ring gauge 16 about fulcrum 27. The design of such a linkage is well within the purview of knowledge of those skilled in the art of mechanical linkages, and consequently it is not thought that any detailed description of a particular design of such linkage need be included herein.

Since the angular displacement of ring gauge 16 is proportional to the square of the velocity of flue gases passing through flue 2, and since the angular displacement of bracket 35 about rod 36 is proportional to the square root of the angular displacement of ring gauge 16, it will be appreciated that the angular displacement of bracket 35 about rod 36 therefore is proportional to the velocity of gases passing through flue 2.

Since the rotation of bracket 35 about rod 36 is proportional to the rate of flow of gases through flue 2, it will be obvious to those skilled in the art that the position of the free end of arm 37, which is formed integrally with bracket 35, will likewise be proportional to the rate of flow of said gases.

From the above description it will be seen that the position of the free end of arm 37 at any time will serve as an indication of the instantaneous rate of flow of gases through flue 2; likewise, it will be seen that the position of the free end 14 of lever 12 will serve as an indication of the instantaneous concentration of solid particles in the flue gas. The mechanism described immediately below serves to combine the signal comprising the position of the free end of arm 37 with the signal comprising the position of the free end 14 of lever 12 to produce a third signal which will reflect the instantaneous rate of flow of solid particles past the point in flue 2 at which the measurement of concentration and rate of flow of gases is being measured.

Numeral 38 designates a carriage which is supported, as for instance, by pivots 39 and 40 for rotation thereabout. A lug 41 is provided along the upper edge of one side of the carriage, and rod 42 is provided to connect the free end of arm 37 with lug 41. Thus, it will be seen that the angular position which carriage 38 assumes about pivot points 39 and 40 is determined by the position of arm 37, which, as pointed out above, is in turn determined by the instantaneous rate of flow of gas through flue 2.

Slots 43 and 44 are provided in the sides of carriage 38, these slots being provided to guide rod 45, which is adapted to move longitudinally along carriage 38 with its ends engaged in said slots. Rod 45 has secured thereto, as for instance by clamp 46, one end of cable 47, the other end of which is secured to free end 14 of lever 12. Rod 45 also has secured thereto one end of spring 48, the other end of which is fastened as for instance to rod 49 secured to carriage 38, for the purpose of supplying a bias to rod 45 causing it to tend to move in a direction away from free end 14 of lever 12.

Roller 50 mounted on pin 51 which is secured to carriage 38 is provided to insure that the pull of cable 47 will always be applied to rod 45 in a direction substantially parallel to the longitudinal axis of carriage 38.

Cable 47 is preferably made of such length that the axis of rod 45 will substantially coincide with the axis of pivots 39 and 40 when free end 14 of lever 12 is in its "at rest" position, that is, the position which it assumes whenever the concentration of solid particles in flue 2 is zero. Then, when end 14 of lever 12 moves to the left, as viewed in Figure 1, in response to clockwise rotation of cam 10 due to an increase in concentration of solid particles passing through flue 2, spring 48 will move rod 45 to the left, in the direction away from pivots 39 and 40. Thus it will be seen that the distance at which rod 45 is located from the axis of pivots 39 and 40, that is, the position of rod 45 along carriage 38, will be determined by the instantaneous value of the concentration of solid particles in the flue gases as reflected by the instantaneous position of free end 14 of lever 12.

Rod 45 has secured thereto a bracket 52, and this bracket is in turn connected, as for instance by rod 53, to the end of arm 54 of bracket 55 which is mounted for rotation about rod 36, about which bracket 35 is also rotatable.

Since the angular displacement of rod 45 about pivots 39 and 40 is determined by the position of arm 37, and since the lateral displacement of rod 45 from the axis of pivots 39 and 40 is determined by the position of free end 14 of lever 12, it will be appreciated that the position of rod 45 at any instant will be proportional both to the instantaneous rate of flow of gases and the instantaneous concentration of solid particles in said gases.

Furthermore, since arm 54 of bracket 55 is secured to rod 45 through the medium of rod 53 and bracket 52 it is seen that the angular displacement of bracket 55 about rod 36 is likewise proportional to both the rate of flow of gases and the concentration of solid particles therein.

It will be appreciated by one skilled in the art that the rotational displacement of bracket 55 about rod 36 is therefore proportional to the rate of flow of solid particles, for instance, catalyst fines, through flue 2. This will be obvious from a consideration of the fact that the movement of rod 45, since such movement is proportional both to rate of flow of gases (for instance, cubic feet per second), and also to concentration of solid particles in said gases (for instance, pounds per cubic foot), mechanically performs the operation of multiplying these two quantities so that the length of the arc through which rod 45 has moved is in reality proportional to their product (that is, for instance, pounds of solid particles per second), and since the angular displacement of bracket 55 is directly responsive to the instantaneous position of rod 45, it is seen that the instantaneous angular displacement of bracket 55 about rod 36 is likewise proportional to the instantaneous rate of flow (for instance, pounds per second) of solid particles through flue 2.

If so desired, bracket 55 may have secured thereto a stylus 56 which may cooperate with chart 57 to provide a continuous record of variations in rate of flow of catalyst. Chart 57 may be driven by any suitable mechanism, for instance, by an electric motor, not shown, and is preferably driven at a constant speed so that the record produced thereon by stylus 56 may constitute a record of catalyst flow versus time. Also, if desired, bracket 35 may be provided with a stylus 58 which may cooperate with chart 57 to produce a record of volume of flow of gas through flue 2 versus time.

The integrator mechanism, generally designated by the numeral 59, is provided for the purpose of maintaining an account of the total weight of catalyst fines discharged through the flue during a given period of time.

In the particular embodiment shown in the drawing, this integrator mechanism comprises a ratchet wheel 60 which is adapted to be rotated periodically by the movement of pawl 61, as will be described hereinafter.

Bracket 62, which is generally U-shaped, is disposed with its legs on opposite sides of ratchet wheel 60 and is mounted on shaft 63 so as to be rotatable thereabout. Shaft 64 is mounted near the closed end of bracket 62 with its opposite ends supported by the legs of bracket 62. Pawl 61 is mounted on shaft 64 in such manner as to permit said pawl to normally rest upon the periphery of ratchet wheel 60. Shaft 64 also carries tripping mechanism 65 having tripping rod 66 which is adapted to engage the upturned rear portion of pawl 61, as will be explained hereinafter, to lift said pawl from engagement with the periphery of ratchet wheel 60. Tripping rod 66 is normally held out of engagement with the upturned rear portion of pawl 61 by the force of biasing spring 67, one end of which is secured to shaft 68 which in turn is secured to tripping mechanism 65, and the other end of which is secured to bracket 62, as for instance by engagement with lug 69.

Lever 70 which is mounted for rotation about shaft 63 has mounted at one end thereof a lug 71 which is adapted to be engaged, as will be explained hereinafter, by tripping foot 72 of tripping mechanism 65. The opposite end of lever 70 has secured thereto one end of rod 73, the opposite end of which is secured to arm 74, which depends from bracket 55. Thus it will be seen that the angular disposition of lever 70 about shaft 63 will be determined by the position of arm 74, which is in turn determined by the angular displacement of bracket 55 about its rod 36. Therefore, the angular disposition of lever 70 is ultimately dependent upon the instantaneous rate of flow of catalyst fines through flue 2.

An oscillating mechanism, not shown, causes bracket 62 to oscillate periodically through a given angle about shaft 63. During this clockwise movement, pawl 61 slides over the periphery of ratchet wheel 60, and eventually moves up onto plate 75. During the counterclockwise motion of bracket 62, pawl 61 rides plate 75 to the end thereof whereupon it engages one of the teeth of ratchet wheel 60. Continued counterclockwise motion of bracket 62 results in counterclockwise rotation of ratchet wheel 60 by pawl 61, and this rotation of ratchet wheel 60 will continue until such time as engagement of lug 71 by tripping foot 72 of tripping mechanism 65 causes tripping rod 66 to engage the rear portion of pawl 61 and thereby lift said pawl from engagement with ratchet wheel 60. Bracket 62, of course, continues through the counterclockwise portion of its oscillating cycle, whereupon the clockwise portion begins and the cycle repeats.

From the above it can be seen that the angular displacement of ratchet wheel 60 upon each cycle of bracket 62 is determined by the position of lug 71 of lever 70, and is therefore determined by the instantaneous rate of flow of catalyst fines through flue 2 at the instant when tripping foot 72 of tripping mechanism 65 engages lug 71. Thus, it will be appreciated that the angular displacement of ratchet wheel 60 actually constitutes a measurement of the approximate total amount of catalyst which passed through flue 2 during a cycle of oscillation of bracket 62.

The time of a cycle of oscillation of bracket 62 can be adjusted as desired but a rate of one cycle in 15 seconds is to be preferred. Using a 15-second cycle, it will be seen that the angular displacement of ratchet wheel 60 will be proportional to the catalyst which has passed a given point in flue 2 during said 15-second period.

If desired, ratchet wheel 60 may be geared, as for instance through gears 76, 77, 78, and 79, to a counting mechanism 80 which may be adapted to give a reading proportional to the angular displacement of ratchet wheel 60. When such a counting mechanism is used it will be obvious that the reading indicated thereby at any time will be proportional to the total catalyst loss since the instant of time at which the counting mechanism was set for zero. Likewise, by checking the reading at the beginning and ending of any time interval, the difference between the two readings will be proportional to the total catalyst loss during said interval of time.

Figure 2:
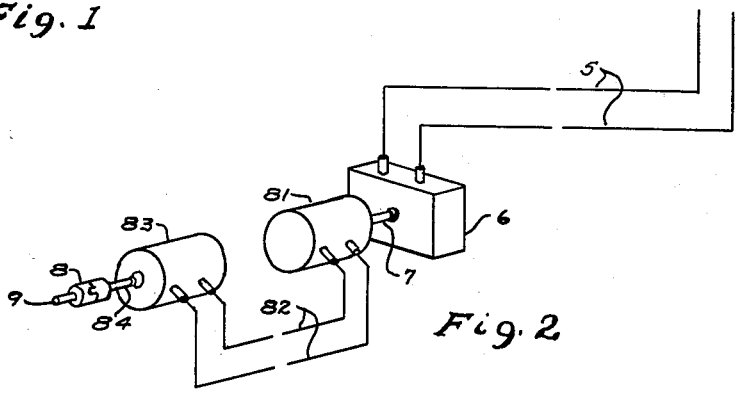
Figure 2 represents a modification which may be made when it is desirable to locate the recording and integrating mechanism at a location remote from the concentration detecting portion of the apparatus.

In Figure 2 there is illustrated an arrangement which may be used when it is desired to locate the indicating and integrating mechanism at a distance from the voltage measuring instrument or moving coil potentiometer 6. In the particular embodiment shown a servo mechanism is employed to impart the rotational movement of shaft 7 to coupling 8 of shaft 9. In such case the shaft 7 of moving coil potentiometer 6 is directly connected to the rotor of servo generator 81, the stator of which is connected, as for instance by wires 82, to servo motor 83 having rotor shaft 84. With such an arrangement, it will be appreciated by those familiar with servo mechanisms that shaft 84 will move in exact synchronism with shaft 7. Thus, shaft 9 may be directly coupled, as for instance by coupling 8, to shaft 84 and will then move in synchronism with shaft 7 to the same extent as though coupled directly thereto as in the arrangement shown in Figure 1.

While there has been shown and described a preferred embodiment of this invention it will be appreciated that numerous changes may be made without departing from the scope thereof. Therefore, it is to be understood that the invention is limited only in accordance with the appended claims.

I claim:

1. In an apparatus for measuring the passage of solid particles in a stream of gas passing through a duct, first means for continuously obtaining a first signal proportional to the instantaneous rate of volume flow of said gas past a selected position in said duct, second means for continuously obtaining a second signal which varies exponentially with changes in the instantaneous concentration of solid particles per unit volume of said gas at said selected position, third means for translating said second signal into a third signal which varies directly proportionally with changes in the instantaneous concentration of solid particles per unit volume of said gas at said selected position, and fourth means for combining said first and third signals obtained from said first, second, and third means to obtain a fourth signal proportional to the instantaneous rate of flow of said solid particles past said selected position.

2. In an apparatus for measuring and recording the passage of solid particles in a stream of gas passing through a duct, first means for continuously obtaining a first signal proportional to the instantaneous rate of volume flow of said gas past a selected position in said duct, second means for continuously obtaining a second signal which varies exponentially with changes in the instantaneous concentration of solid particles per unit volume of said gas at said selected position, third means for translating said second signal into a third signal which varies directly proportionally with changes in the instantaneous concentration of solid particles per unit volume of said gas at said selected position, fourth means for combining said first and third signals obtained from said first, second, and third means to obtain a fourth signal proportional to the instantaneous rate of flow of said solid particles past said selected position, and means for continuously recording said fourth signal.

3. In an apparatus for measuring and recording the passage of solid particles in a stream of gas passing through a duct, first means for continuously obtaining a first signal proportional to the instantaneous rate of volume flow of said gas past a selected position in said duct, second means for continuously obtaining a second signal which varies exponentially with changes in the instantaneous concentration of solid particles per unit volume of said gas at said selected position, third means for translating said second signal into a third signal which varies directly proportionally with changes in the instantaneous concentration of solid particles per unit volume of said gas at said selected position, fourth means for combining said first and third signals obtained from said first, second, and third means to obtain a fourth signal proportional to the instantaneous rate of flow of said solid particles past said selected position, integrator means responsive to said fourth signal to continuously give an indication of the cumulative total amount of said solid particles carried by said gas past said selected position, and means for impressing said fourth signal upon said integrator means.

4. In an apparatus for measuring the passage of solid particles in a stream of gas passing through a duct, the combination comprising first means for continuously obtaining a first signal proportional to the instantaneous rate of volume flow of said gas past a selected position in said duct, second means for generating an electrical signal which varies exponentially with changes in the concentration of solid particles per unit volume of gas at said selected position, first translating means for translating said electrical signal into a mechanical signal which also varies exponentially with changes in said concentration, second translating means for translating said mechanical signal into a second signal which is directly proportional to the instantaneous concentration of solid particles per unit volume of said gas at said selected position and combining means for combining said first and said second signals to produce a third signal which is proportional to the instantaneous rate of flow of said solid particles past said selected position.

5. Apparatus in accordance with claim 4 wherein the means for generating an electrical signal is a light source and a photo-electric cell adapted to produce a voltage which varies exponentially with changes in the concentration of solid particles per unit volume of gas, the first translating means is a moving coil potentiometer having a shaft whose rotational displacement is proportional to changes in said voltage, and the second translating means comprises a cam secured to said shaft, a cam roller adapted to bear against the periphery of said cam, the periphery of said cam being logarithmically developed whereby the distance between the center of rotation of said shaft and the point on the periphery of said cam at which said cam roller bears is proportional to the logarithm of the rotational displacement of said shaft, and means connected to said cam roller for translating the motion of said cam roller into the second signal.

6. In an apparatus for measuring the passage of solid particles in a stream of gas passing through a duct, first means for continuously obtaining a first signal proportional to the instantaneous rate of volume flow of said gas past a selected position in said duct, second means for continuously obtaining a second signal which varies exponentially with changes in the instantaneous concentration of solid particles per unit volume of said gas at said selected position, transmitting means for electrically transmitting said second signal to a remote point spaced a substantial distance from the point at which said second signal is obtained, third means for translating said second signal into a third signal which varies directly proportionally with changes in the instantaneous concentration of solid particles per unit volume of said gas at said selected position, and fourth means for combining said first and third signals obtained from said first, second, and third means to obtain a fourth signal proportional to the instantaneous rate of flow of said solid particles past said selected position.

7. Apparatus in accordance with claim 6 wherein the transmitting means is a servo-generator located at the point at which the second signal is obtained, a servo-motor located at the remote point and electrical conductor means connecting said servo-generator and said servo-motor.

References Cited in the file of this patent

UNITED STATES PATENTS

| | | |
|---|---|---|
| 1,100,171 | Brown | June 16, 1914 |
| 2,082,539 | Fischer | June 1, 1937 |
| 2,345,272 | Luhrs | Mar. 28, 1944 |
| 2,363,473 | Ryder | Nov. 21, 1944 |
| 2,524,241 | Vetter | Oct. 3, 1950 |
| 2,570,410 | Vetter | Oct. 9, 1951 |

FOREIGN PATENTS

| | | |
|---|---|---|
| 474,421 | Great Britain | Apr. 27, 1937 |